Nov. 12, 1968  C. B. JACKSON  3,410,191
METHOD AND APPARATUS FOR ATMOSPHERE CONTROL
IN CLOSED COMPARTMENTS
Filed Aug. 31, 1966
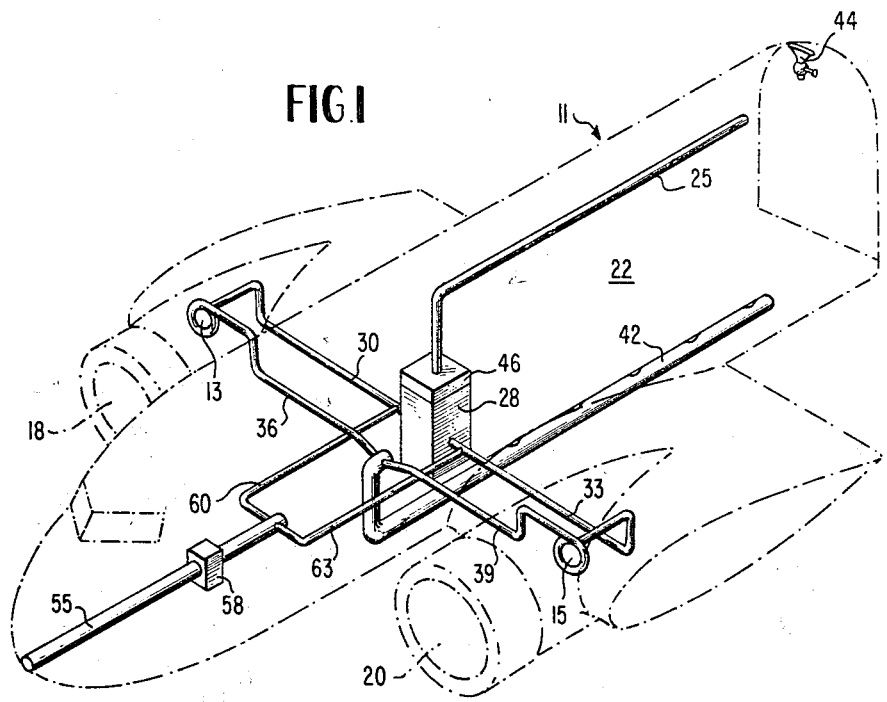
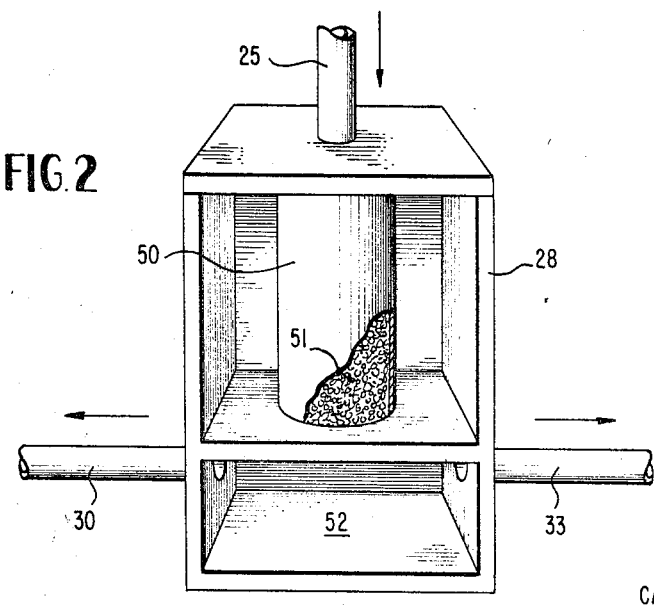
INVENTOR.
CAREY B. JACKSON
BY *McLean & Dibble*
ATTORNEY

United States Patent Office 3,410,191
Patented Nov. 12, 1968

3,410,191
METHOD AND APPARATUS FOR ATMOSPHERE CONTROL IN CLOSED COMPARTMENTS
Carey B. Jackson, Pompano Beach, Fla., assignor, by mesne assignments, to "Automatic" Sprinkler Corporation of America, Cleveland, Ohio, a corporation of Ohio
Continuation-in-part of application Ser. No. 386,508, July 31, 1964. This application Aug. 31, 1966, Ser. No. 576,213
5 Claims. (Cl. 98—1.5)

ABSTRACT OF THE DISCLOSURE

Pressurized air in a closed but not heremtically sealed chamber surrounded by atmospheric air at a substantially lower pressure is cycled through a zone where harmful components are removed and oxygen is added. Enough air is admitted to the chamber from externally thereof to make up for leakage of air from the chamber.

This application is a continuation-in-part of my pending application Ser. No. 386,508 filed July 31, 1964 for Method and Apparatus, now abandoned.

This invention pertains to atmosphere control and is concerned in particular with the maintenance of fresh air under conditions suitable for human habitation in closed, but not hermetically sealed, compartments. In the art of atmosphere control an almost complete divergence has taken place in the methods and means adopted for providing a living atmosphere, depending upon whether atmospheric air is readily available. Where such air is clearly inconvenient or impossible to obtain, as, for example, in submarines or space vehicles, means have been adopted for purification of the air in a closed hermetically sealed system. The purification generally involves removal of carbon dioxide and other noxious or at least undesirable gases from the air and a replenishment of the oxygen metabolized by the inhabitants of the compartment.

Where air may conveniently be obtained from the atmosphere outside the compartment, atmosphere control usually takes the form of ventilation, whereby enough air is allowed to escape from the closed compartment and is replaced by fresh air from the outside to keep the atmosphere pleasant or at least viable.

In airplanes used for atmospheric flights, ventilation is universally used for atmosphere control in the passenger compartments. It is usual for the inside of airplane passenger compartments to be pressurized when high flights are taken through thin atmospheres. The air pressure is not usually maintained at ground pressure since the resulting pressure difference would cause severe strain or possible rupture of the compartment walls or some components thereof. Rather a pressure is usually maintained similar to that observed at elevations of about 5,000 to 10,000 feet above sea level. While air travel has evolved from simple open-cockpit flights to stratospheric travel within closed compartments the only basic change in atmosphere control has been the introduction of equipment to keep the air within the passenger compartments at a comfortable pressure level by pumping into the compartments air from the thin atmosphere outside the plane while still permitting pressurized air from within the compartment to escape for purposes of ventilation.

It has been discovered that in some present-day high atmospheric flights up to about 4% of the power of the engines may be diverted to air pressurization. This invention provides a significant reduction in this power utilization enabling the power saved to be employed in reducing the time of airplane flights by increasing speed, or in other ways reducing fuel consumption.

In this invention, pressurized air in a closed but not hermetically sealed chamber, surrounded by atmospheric air usually at a lower pressure, is chemically purified and recycled within the chamber and amplified with air drawn from outside the chamber only to make up for unavoidable air leakages or pressure adjustments. The apparatus provides an air purification zone through which air cycled in the closed compartment passes to remove unwanted components and replenish oxygen. Usually this passage is assured by a pump which may be up-stream or down-stream of the purification zone. Ingress is provided for air from outside the compartment to replace air lost by leakage and this air may be combined with recycle air for passage through the pump. Further apparatus may also be provided for conditioning of the air in various respects, e.g. cooling, dehumidifying, etc.

Recycle air is passed through an air purification zone in which one or a plurality of operations are performed on the air, that is, oxygen is supplied and harmful components are removed. Often these functions may be performed by passing the air through a canister containing one or more chemical substances to absorb water, carbon dioxide, bacteria and particulate matter suspended in the air, such as smoke and grease particles. A good air purifier will also convert carbon monoxide and also some organic materials to carbon dioxide and will generate oxygen.

One such material, potassium superoxide, is described in "Aero/Space Engineering," volume 19, number 5, May, 1960, pp. 40, 41 and 94. This solid chemical converts carbon dioxide and water to potassium bicarbonate while releasing oxygen. Also, sodium superoxide, calcium superoxide and lithium superoxide may be used. The canister also may contain lithium hydroxide for additional capacity to absorb acid gases like carbon dioxide and a water vapor absorbent such as calcium chloride or silica gel. Oxidation catalysts such as mixtures of manganese oxide and copper oxide or copper oxide and chromium oxide may also be included in the pack. Such multiple action air purification packs are available commercially for use in fire rescue equipment, etc., and the use of such materials can allow atmosphere control in a closed but leaking chamber like an airplane passenger compartment at only a fraction of the cost of ventilation system involving compartment pressurizing of thin fresh atmospheric air alone for atmosphere control.

Conventional airplane compartment pressurizing systems can easily be adapted to incorporate the air purification equipment employed in this invention, as can be seen from the accompanying drawing in which:

FIGURE 1 is a schematic view of an airplane employing the novel apparatus of this invention; and FIGURE 2 is a more detailed drawing of an air purification zone.

In the drawing, an airplane 11 has pumps 13 and 15 associated with its engines 18 and 20. Pumps 13 and 15 serve to draw air from inside cabin 22 through exhaust duct 25, purification chamber 28 and lines 30 and 33. Air is pumped back into compartment 22 by means of lines 36 and 39 which lead to air inflow header 42. Ventilation valves such as 44 are used in most airplane passenger compartments for ventilation during flight and may be used with airpranes having the novel apparatus of this invention when such are needed for cabin depressurization, as for example, during the stages of take-off and ascent.

Air purifier 28 may be provided with cooling mechanism 46 or exhaust duct 25 may lead directly to purification zone 28 as shown in FIGURE 2. A filter (not shown) may be provided for passage of exhaust air before passage of air through canister 50 which ideally will be a removable canister containing a supply 51 of the air purification chemical or mixture described above, sufficient to purify air and evolve oxygen for the expected duration of the flight. In this way the air purification chemicals may be easily removed and replaced by ground crews between flights. The canister will usually have perforated ends (not shown) for easy entry and exit of the recycle air and may be held above exit plenum chamber 52 by any suitable means. Recycle purified and replenished air, in the embodiment shown, passes from the plenum chamber back to the passenger compartment under the influence of pumps 13 and 15.

To provide make-up air for that unavoidably lost by leakage from compartment 22, or for repressurizing air in the compartment during descent and landing, duct 55 is open to the atmosphere. This duct leads by way of valve 58 to ducts 60 and 63 connected to ducts 30 and 33, respectively, whence additional air may be mixed with recycle air. Valve 58 is preferably automatically opened, by known means, in response to an absolute pressure decline within the compartment or by the change in pressure difference between the inside of the compartment and the outside environment, for example, during descent. Valve 58 also is automatically closed when sufficient air is present in compartment 22.

It is claimed:

1. A method for atmosphere control in a closed but not hermetically sealed chamber in which the air is at a pressure substantially higher than the atmosphere outside said chamber which comprises passing air in said chamber through a zone wherein harmful components are removed from the air and oxygen is added to the air, and admitting to the said chamber substantially only enough air from the atmosphere outside said chamber to make up for unavoidable leakage of air from said chamber.

2. In an airplane having a passenger compartment and means for maintaining air within the compartment at a pressure substantially higher than the atmosphere outside said airplane, the improvement which comprises a canister having means including an alkali metal or alkaline earth metal superoxide selected from the group consisting of potassium superoxide, sodium superoxide, calcium superoxide and lithium superoxide for chemical purification of air and addition of oxygen thereto, means for circulating air from said passenger compartment, through said canister and back to said compartment, and means for admitting air from said outside atmosphere to said circulating means.

3. The combination set forth in claim 2, wherein said means for chemical purification also includes lithium hydroxide to absorb acid gases.

4. The combination set forth in claim 2, wherein said means for chemical purification also includes a water vapor absorbent selected from the group consisting of calcium chloride and silica gel.

5. The combination set forth in claim 2, wherein said means for chemical purification also includes an oxidation catalyst selected from the group consisting of a mixture of manganese oxide and copper oxide and a mixture of copper oxide and chromium oxide.

References Cited
UNITED STATES PATENTS 2,181,199  11/1939  Otterson _____ 128—204

MEYER PERLIN, *Primary Examiner.*